Nov. 14, 1967   J. T. MAYNARD   3,353,078
DYNAMOELECTRIC MACHINE AND CONTROL THEREFOR
Filed Jan. 29, 1965   3 Sheets-Sheet 1

INVENTOR.
JOHN T. MAYNARD
BY Andrus & Starke
Attorneys

INVENTOR.
JOHN T. MAYNARD
BY
Andrus & Starke
Attorneys

Nov. 14, 1967  J. T. MAYNARD  3,353,078
DYNAMOELECTRIC MACHINE AND CONTROL THEREFOR
Filed Jan. 29, 1965  3 Sheets-Sheet 3

INVENTOR.
JOHN T. MAYNARD
BY
Andrus & Starke
Attorneys

United States Patent Office 3,353,078
Patented Nov. 14, 1967

3,353,078
DYNAMOELECTRIC MACHINE AND
CONTROL THEREFOR
John T. Maynard, West Allis, Wis., assignor to A. O.
Smith Corporation, Milwaukee, Wis., a corporation of
New York
Filed Jan. 29, 1965, Ser. No. 428,975
4 Claims. (Cl. 318—227)

ABSTRACT OF THE DISCLOSURE

An A.C. motor is connected to drive a centrifugal blower having a centrally located air input opening. The control circuit components for the motor are mounted within the housing of the motor. A control chamber is formed within the motor by axially extending the usual stator housing with the axial space between the end of the aligned stator and rotor and the corresponding end bell defining the control chamber. The usual motor terminal board is mounted on the end bell and the speed control elements are mounted on the terminal board to provide a small compact assembly. The motor is mounted partially within the inlet with the control chamber in the path of the inlet air such that there is continuous movement of air over the end bell during the operation of the motor. A pair of firing circuits is provided, one of which generates a firing signal which varies with the temperature of the air being heated to adjust the speed of the motor to the condition. The other generates a fixed firing signal during the terminal portion of the input voltage wave and thereby maintains a minimum voltage applied to the motor and a minimum motor speed. Consequently, the motor will run continuously under essentially no load conditions.

---

This invention relates to an alternating current (A.C.) dynamoelectric machine and a control therefor and particularly to a speed control for permanent split capacitor motors and the like.

The speed of an A.C. motor can be controlled by varying the input or excitation voltage to the motor winding. Generally, variable input voltage controls have been applied to the A.C. motors which do not require separate switches for removing a starting winding. Such controls have not been widely employed however because of the lack of sufficiently reliable, simple and inexpensive circuitry and control components. As disclosed in an article in the August 1964 issue of Home Appliance Builder, semi-conductor circuits for varying the input voltage and thereby varying the speed of the motor have been recently suggested. Generally, the control may employ switching on both the positive and the negative half-cycles of the input voltage sine wave to chop the wave and thereby vary the voltage applied to the motor.

The present invention is particularly directed to a new and novel construction employing a semi-conductor circuit for speed control with the control components mounted as an integral or unitary part within the motor. Generally, in accordance with the present invention, the control circuit components are mounted within the housing of the motor rather than as a separate and distinct control unit except for condition responsive control elements which must be exteriorly mounted. A control chamber is formed within the motor in a preferred construction, by axially extending the usual stator housing with the axial space between the end of the aligned stator and rotor and the corresponding end bell defining the control chamber. The usual motor terminal board is mounted on the end bell and the speed control elements are mounted on the terminal board to provide a small compact assembly.

In many motor applications, such as for driving a fan or blower, the motor speed preferably varies with the condition established by the fan or blower. Thus, a thermistor or other condition responsive means may be connected into the circuit by suitable leads to allow remote positioning of the condition responsive means.

Generally, the semi-conductor switching means of the circuit carries the motor power current and consequently should be cooled to maintain reliable operation for any significant period. In accordance with the present invention the switch is mounted in heat exchange relation with the end bell which serves as a heat sink.

The motor of this invention may advantageously be formed as part of a centrifugal blower having a centrally located air input opening. The motor is mounted partially within the inlet with the end bell in the path of the inlet air such that there is continuous movement of air over the end bell during the operation of the motor. This provides a very reliable means of maintaining cooling not only of the switch means but the other control components mounted within the control chamber.

The preferred control of the present invention also provides an improved switching trigger circuit as a part of the control circuitry. An alternating current motor is a highly inductive load and consequently the current lags the applied voltage. Further, the angle of lag or phase difference is variable with the load. The present invention provides a firing circuit connected directly to the incoming power lines such that the pulse generation control is independent of the motor current. This maintains accurate and reliable generation of the firing signals to the switch means.

In accordance with another important aspect of the circuit portion of this invention, a pair of firing circuits is provided, one of which generates a firing signal which varies with the condition being sensed to adjust the speed of the motor to the condition. The other generates a fixed firing signal during the terminal portion of the input voltage wave and thereby maintains a minimum voltage applied to the motor and a minimum motor speed. Consequently, the motor will run continuously under essentially no load conditions. This form of circuitry is particularly desirable in connection with air blowers for forced air heating and the like as the continuous motor operation eliminates the high starting surges and increases the life and reliability of the motor. Additionally, a continuous small movement of air throughout the conditioned area is established to provide improved evenness of temperature and humidity.

The drawings furnished herewith illustrate preferred constructions of the present invention in which the above features and advantages are clearly disclosed as well as others which will be clear from the subsequent description of the drawings.

Figure 1:
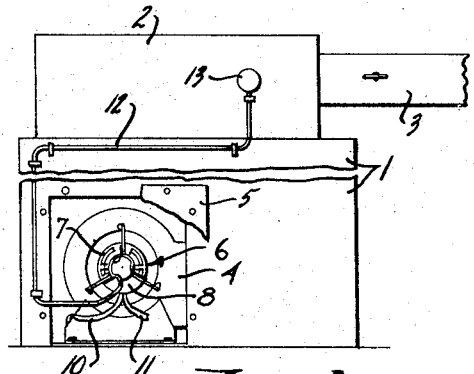
FIG. 1 is a pictorial view of a forced air furnace with parts broken away to show the mounting of a motor constructed in accordance with the present invention.

Referring to the drawings and particularly to FIG. 1, a hot air furnace is diagrammatically shown including an outer decorative housing or enclosure 1 with a heating bonnet 2 mounted and secured to the top of the housing. An air distribution duct 3 is secured to the bonnet 2 and extends to any area to be heated. Details of the furnace structure may be of any well known or other suitable variety and no detailed description thereof is given other than to show a blower unit 4 which is mounted within the bottom portion of the housing 1 to provide for forced circulation of air over the heating means, not shown, and then through the bonnet 2 and duct 3. The blower unit 4 is mounted behind a door or access cover 5 in accordance with the usual construction. Unit 4 is a centrifugal type blower having a central air intake within which a motor 6, constructed in accordance with the present invention, is mounted. As more fully developed hereinafter, motor 6 includes an outer end cover or bell 7 having a small terminal access cover 8 which can be removed to allow access to a terminal board 9 for making all the power and control circuit connections. Generally, a power lead 10 is connected to appropriate terminals on the terminal board 9 and extends downwardly through an outer opening in the motor housing to a suitable source of power, not shown. The motor 6 is a permanent split capacitor type motor and a relatively large motor start and run capacitor, not shown in FIGS. 1-4, is mounted exteriorly of the motor 6 to one side of unit 4. A motor capacitor lead 11 is connected to the terminal board 9 and extends outwardly to the motor capacitor, not shown. A temperature sensing lead 12 is also connected in circuit at the terminal board 9 and extends outwardly through a central opening in the cover 8 to the bonnet 2. A temperature sensing element 13, such as a thermistor or the like, is connected to the end of lead 12 and mounted in bonnet 2 to sense the temperature of the air flowing through the bonnet. The temperature sensing element 13 provides a variable signal means connected in circuit with the control circuit, the components of which are mounted within a control chamber immediately within the end bell 7 of motor 6.

The apparatus of FIG. 1 controls motor 6 to operate the blower unit 4 at a speed generally related to the temperature of the air in bonnet 2. Thus, as the temperature varies, element 13 produces a related signal to the control circuit which varies the power applied to motor 6 and thereby varies the speed. As a result, when demand for heated air is made, the motor 6 will operate to provide slightly heated air immediately and increase the flow as the temperature rises. The system therefore provides an increase in response time and a more gradual correction than the more conventional on-off variety presently employed in forced air systems.

More particularly, in the illustrated embodiment, motor 6 includes a cylindrical outer housing 14 within which an annular stator unit 15 is secured. A rotor unit 16 is mounted within the stator unit 15 by a shaft 17 which is journaled at the opposite ends in the end bell 7 and an end bell 18 by a similar ball bearing unit 19. The motor 6 of the present invention employs ball bearing unit 19 rather than the conventional sleeve bearings to permit low speed motor operation for extended periods. Of particular significance is the extension of the stator housing 14 axially outwardly of the aligned stator unit 15 and rotor unit 16 to the adjacent end bell 7 in order to define a small interior control chamber 20 within which the terminal board 9 is located.

The motor 6 is mounted within the air intake of blower unit 4 by three circumferentially spaced motor mounts 21 which are secured to suitable axial projections or hubs 22 on the outer surfaces of end bells 7 and 18. The inlet opening through to blower unit 4 is somewhat larger than the outer diameter of the housing 14 to define an annular air passageway over the exterior surface of the motor 6. Additionally, end bells 7 and 18 are apertured as at 23 to permit passage of cooling air through as well as over the motor 6. As shown most clearly in FIG. 3, the motor 6 is mounted with the end including end bell 7 disposed exteriorly of the blower unit 4.

Figure 2:
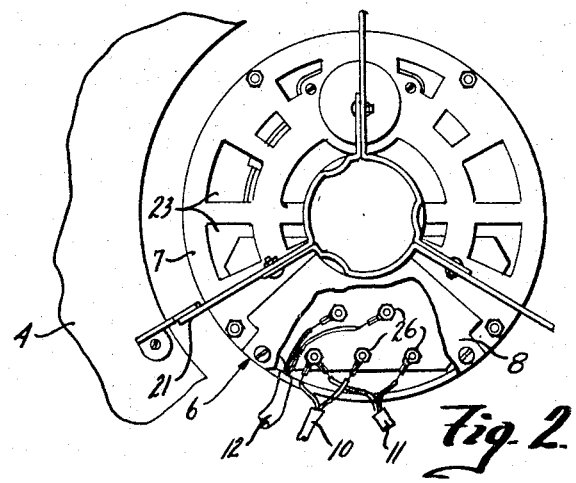
FIG. 2 is an enlarged end view of the motor to show details of motor construction.
Figure 3:
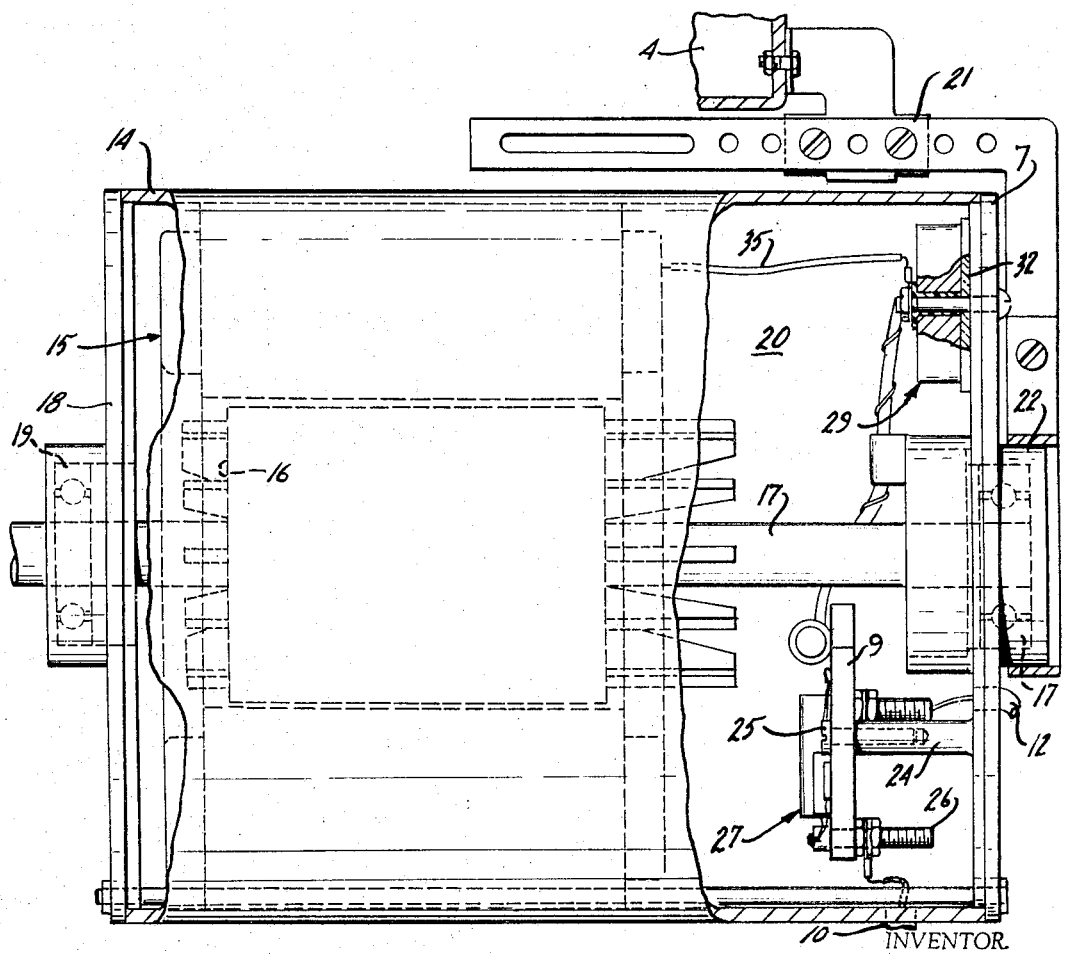
FIG. 3 is a side view of FIG. 2 with parts broken away and sectioned to show details of construction.
Figure 4:
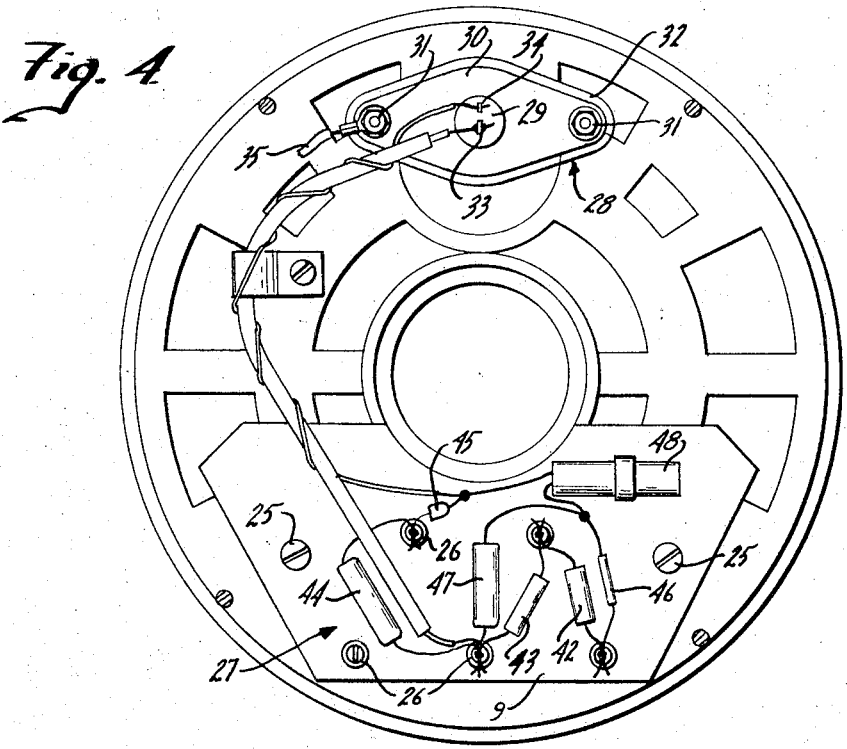
FIG. 4 is an elevational view of the inner surface of an end bell shown in FIGS. 2 and 3.

Referring particularly to FIGS. 2–4, the terminal board 9 is a small plate-like member secured to a pair of inwardly projecting terminal board supports 24, which are integrally formed on the inner surface of the end bell 7 by suitable bolts 25. In the illustrated embodiment, five terminal studs 26 are secured to the board 9 and project axially outwardly but terminate completely within the control chamber 20. The leads 10, 11 and 12 are connected to appropriate studs 26 as more fully described in connection with the preferred circuit of FIG. 5. A plurality of solid state control elements 27 is secured to the back side of the terminal board 9 and in combination with element 13 and a solid state switching unit 28, which is mounted directly on the end bell 7, constitutes a variable speed control means.

The illustrated solid state switch unit 28 includes a symmetrical alternating current switch 29 imbedded within a heat sink 30 formed of a suitable metal, such as a die cast aluminum. The heat sink 30 is secured to the inner surface of the end bell 7 by bolts 31 or the like with a thin foil or layer of mica insulation 32 interposed between the end bell 7 and the heat sink 30. The mica insulation 32 electrically isolates the heat sink 30 from the end bell 7 while maintaining good thermal conductivity therebetween to transfer heat from switch 29 and unit 28 to bell 7, as shown in FIG. 3.

The switch 29 includes a main terminal 33 and a gate terminal 34 shown projecting inwardly in side-by-side relation. The other main terminal of the switch 29 is through the heat sink 30 which is shown connected by a lead 35 to the common side of the motor windings of the stator unit 15.

During the operation of the motor, the apertured end bells 7 and 18 allow the passage of air through the motor 6 and thus over the area of the switch 29 as well as the circuit components 27. As a result, a continuous and proportional cooling of the components is maintained.

The interior mounting of essentially the entire control circuit provides a compact assembly with a minimum amount and length of wiring. The mounting of the main switch 29 and the other control components on the end bell 7 provides optimum cooling which in the case of solid state components is of great significance in providing long operating life. Further, the particular mounting to the back side of terminal board 9 permits convenient and low cost manufacture of the motor and its control as well as subsequent maintenance servicing of the motor.

Figure 5:
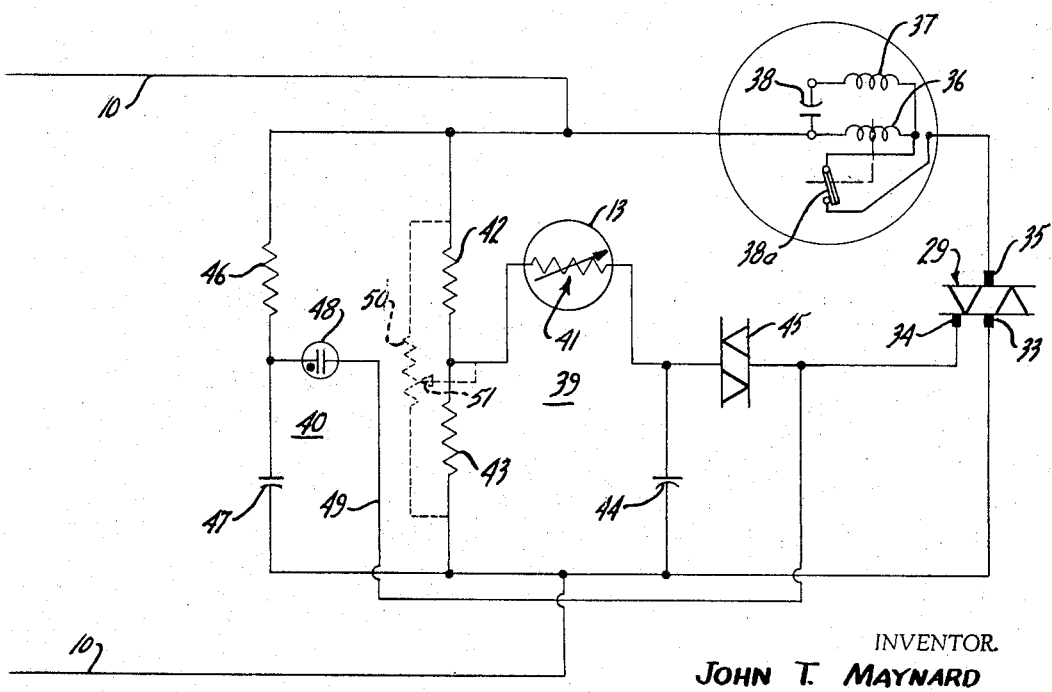
FIG. 5 is a schematic circuit diagram showing a circuit including the components mounted as shown in FIGS. 1–4, inclusive.

FIG. 5 is a schematic circuit diagram employing components 27 in a highly satisfactory solid state control for forced air furnaces and similar application. Corresponding elements in FIG. 5 and FIGS. 1–4 are similarly numbered for simplicity and clarity of explanation.

In FIG. 5, motor 6 is schematically shown including a running winding 36 connected in parallel with a starting winding 37 and a capacitor 38. The paralleled motor winding circuit is connected to one side of the power line 10 and in series with a thermal overload device 38a and the switch 29 to the opposite side of line 10. The overload device 38a is imbedded within the running winding 36, as shown by the dashed coupling line, and opens the energizing circuit in the presence of dangerous winding temperatures. Additionally, the cutout temperature is preferably selected to be less than the maximum safe operating temperature of the windings to simultaneously protect the control components which are mounted within the motor and directly affected by the temperature of the motor.

The switch 29 is schematically shown as a symmetrical alternating current solid state switch with the main electrodes identified by the numbers 33 and 35, as in FIG. 4, and connected respectively to the one side of the paralleled motor winding circuit and the opposite side connected directly to the opposite power line 10. The single gate 34 is adapted to trigger the switch 29 to conduct in either direction for the corresponding half cycle, the switch automatically turning off at current reversal.

In the illustrated embodiment of the invention, a pair of separate trigger or firing circuits 39 and 40 is connected to separately provide timed pulses to the gate 34 related to the alternating current voltage supplied to motor 6. The first trigger circuit 39 is designed to produce a variably phased or timed signal and includes a thermistor 41 forming a part of the temperature sensing element 13 such that the time the signal is generated is directly related to the temperature in the furnace bonnet 2. In contrast, the second trigger circuit 40 is arranged and constructed to provide a periodic pulse of fixed time to gate 34 independently of the temperature conditions. The fixed trigger circuit 40 is selected therefore to establish firing of the switch 29 to maintain a minimum voltage application to the motor winding circuit including windings 36 and 37 and therefore provide a minimum speed. The first or adjustable trigger circuit 39, however, provides for an overriding control which will increase the speed above the minimum to the maximum permitted by the motor design and the like.

More particularly, the illustrated adjustable trigger circuit 39 includes a pair of voltage divider resistors 42 and 43 connected in series directly across power line 10 to provide an essentially fixed voltage at the junction of the resistors 42 and 43. Thermistor 41 is connected in series with a timing capacitor 44 between the junction of resistors 42 and 43 and the one side of power line 10 and thus in parallel with the resistor 43. The capacitor 44 is therefore charged to a voltage appearing across resistor 43 during each half cycle with the time required to reach full value determined by the value of the resistance of thermistor 41.

A symmetrical alternating current trigger diode 45 connects the junction of the thermistor 41 and the timing capacitor 44 to the gate 34 of switch 29. The trigger diode 45 is a well-known device which breaks down and conducts, in both directions, in response to a selected voltage of related polarity applied across the diode. In the present invention, during each half cycle, the voltage of capacitor 44 increases and when the voltage reaches the firing level of the diode 45, the capacitor rapidly discharges to the gate 34 of switch 29 and fires it into a conducting state. As is well known, only a momentary pulse is required after which the switch 29 continues to conduct until the corresponding load current reversal. By proper selection of the voltage dividing network, the capacitor 44 is caused to provide a firing pulse related to the condition of thermistor 41 to correspondingly vary the energy supply to the motor 6 between zero and maximum.

Of particular significance is the connection of both of the trigger circuits 39 and 40 directly across the power line 10 to provide a three terminal device with energy to the firing circuit directly from line 10 and independent of the load. An inductive load such as a motor causes the current to lag the voltage. Consequently, the current through the switch 29 does not follow the applied voltage. Further, the phase difference or angle of the voltage with respect to the current is not constant but will be a minimum at full load and a maximum at no load. In a practical construction, it has been found that the angle will vary from 25 electrical degrees at full load to 65 electrical degrees at no load. If the timing circuit is energized by an inductive load current, the energy supplied to the timing circuit will vary with the load and consequently will not be solely dependent on the temperature condition as desired. Consequently, non-symmetrical triggering of the switch 29 may result and generate an effective direct current (D.C.) in the circuit. Although this is not of any particular concern in connection with resistive loads, an effective D.C. signal in the inductive load can cause rapid destruction of the load. Once the system becomes unstable it would be exceedingly difficult to correct itself. Further, the motor generates a back EMF which will prevent the precise turn-off of the voltage wave and will in effect maintain a continuous voltage application in the circuit. Consequently, the present invention by providing the separate power connection to the same source as motor 6 eliminates such disadvantages and maintains long, reliable and repeatable operation.

The harmonic content of the chopped voltage wave does not contribute to useful torque but rather increases motor losses. Consequently, the motor may run at a somewhat lower speed than the more conventional alternating current wave driven motor or the motor design may desirably be modified somewhat. However, the use of solid state switches permits a small and compact mounting and eliminates large voltage and current transients.

As previously noted, the present invention provides the fixed trigger circuit 40 in combination with the adjustable trigger circuit 39. In the illustrated embodiment of the invention, the fixed trigger circuit 40 includes a timing resistor 46 connected in series with a timing capacitor 47 directly across the power lines 10 and thus in parallel with the voltage dividing resistors 42 and 43 of the trigger circuit 39. A "Neon" lamp 48 is connected to the junction of the resistor 46 and capacitor 47 and by a lead 49 directly to the gate 34. During each half cycle, the capacitor 47 will charge to the breakdown voltage level of the neon lamp after which the charged capacitor 47 will rapidly discharge to the gate 34 and transmit a pulse signal to turn on the switch 29 if the adjustable trigger circuit 39 has not previously fired the switch 29. If the switch 29 has been fired, the additional pulse has no effect. If the trigger circuit 39 has not been fired, the pulse from fixed trigger circuit 40 fires the switch 29 to apply the remaining portion of the voltage wave to the motor 6. In this manner, a minimum voltage is applied to the motor 6 to maintain a minimum operating speed.

It is important to employ a neon lamp 48 or other similar device having a breakdown voltage in excess of the breakdown voltage of the trigger diode 45 of circuit 39 to prevent current leakage from the adjustable trigger circuit 39. If the neon lamp 48 and the diode 45 were essentially of the same breakdown voltage, when the diode 45 fired or conducted, its voltage could have a tendency to cause the neon lamp 48 to also fire and provide a current path through the neon lamp 48 and capacitor 47 to the common return line in parallel with the gate 34 and electrode 33. This would divert current from the gate 34 and might prevent firing of the switch 29 and malfunctioning of the circuit. However, the higher voltage of the neon lamp 48 insures that at no time will the circuit malfunction. The high voltage of the fixed trigger circuit 40 also provides sufficient current such that if the diode 45 fires and bleeds current from the circuit of lamp 48, the switch 29 will fire.

Figure 6:
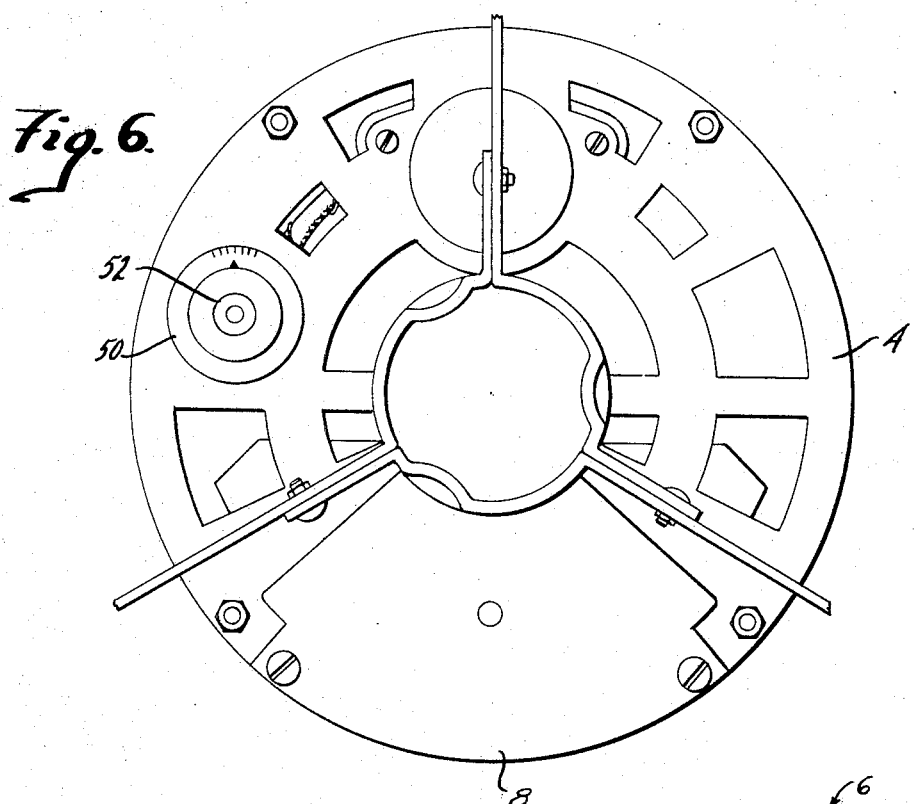
FIG. 6 shows an end view of a motor similar to FIG. 2 with a variable potentiometer formed as an integral part of the motor.

In FIG. 5, a modification to the circuit is shown in phantom. The fixed voltage divider resistors 42 and 43 may be replaced with a potentiometer 50 having an adjustable tap 51 connected to the corresponding side of the thermistor 41 to provide an adjustable voltage take-off to the circuit of capacitor 44. This permits a variable temperature set point control over a limited range.

Where a potentiometer 50 is employed it can be connected for remote location and connected in circuit by suitable connecting leads, or it can be mounted as an integral part of the end bell 7 as shown in FIG. 6. Exterior control knob 52 would be coupled to tap 51 for preselecting the set point temperature. This provides a small, compact and convenient control assembly and will further maintain continuous cooling of the potentiometer 50.

Of particular importance is the fact that all of the control elements shown in FIG. 5 except the thermistor 41 and switch 29, and potentiometer 50 if used, are mounted directly to the terminal board 9 as shown in FIGS. 3 and 4. The control assembly is therefore mounted in a convenient and compact manner and in position to provide continuous cooling.

Figure 7:
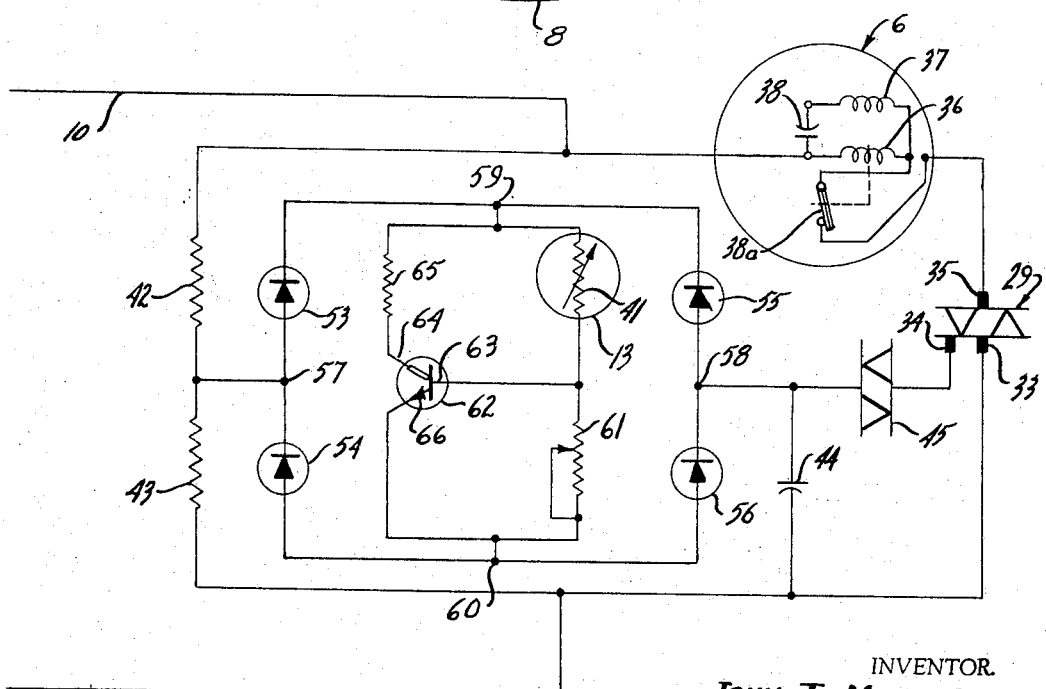
FIG. 7 is a schematic circuit diagram similar to FIG. 5 showing an alternate circuit constructed in accordance with the teaching of the present invention.

The illustrated circuit shows a highly satisfactory and preferred construction for a furnace blower and the like. However, other solid state control circuits can readily be constructed in accordance with the concepts of the present invention. For example, well known silicon controlled rectifiers can be employed to trigger during each half cycle and provide application of power, generally as disclosed by the illustrated circuit. Other suitable solid state switching and firing circuits may also be employed in accordance with the broadest concept of the present invention. For example, a signal amplifying circuit within an adjustable trigger circuit is shown in FIG. 7. For purposes of simplicity and clarity as well as continuity of explanation, corresponding elements in the schematic circuit of FIGS. 5 and 7 are similarly numbered.

Referring to FIG. 7, the switch 29 is connected in series with the motor 6 directly across power lines 10 and in parallel with the voltage dividing resistors 42 and 43. The switch 29 is fired by the charging of the timing capacitor 44 which is connected to the gate 34 of switch 29 through the trigger diode 45. In FIG. 7, however, the charging of the capacitor 44 is controlled through a four diode bridge connected between the voltage divider junction and the top side of the capacitor 44. The illustrated bridge includes four diodes 53, 54, 55 and 56 connected in the usual closed bridge circuit having input terminals 57 and 58 connected respectively to the junction of resistors 42 and 43 and to the capacitor 44. The diode bridge is completed between a pair of output terminals 59 and 60 as follows. The thermistor 41 is connected in series with an adjustable rheostat 61 between terminals 59 and 60 to provide a voltage divider. A transistor 62 has a base 63 connected to the junction of thermistor 41 and rheostat 61 to bias the transistor 62 in accordance with the voltage of the divider. A collector 64 of transistor 62 is connected in series with a resistor 65 to the first output terminal 59 and an emitter 66 of transistor 62 is connected directly to the opposite output terminal 60. The capacitor 44 is charged with an alternating current in phase with the voltage supplied to the motor 6 with each half cycle modulated by the transistor 62.

Generally, the firing circuit of FIG. 7 also functions to provide an adjustably phased pulse. However, in the circuit of FIG. 7, the diode bridge converts the alternating current to a full wave direct current between terminals 59 and 60 with the output of the thermistor 41 to variably bias the base 63 of transistor 62 and produce an output to capacitor 44 proportional to the operation of transistor 62. The thermistor 41 thus functions to vary the conductive state of the transistor 62 which in turn varies the alternating charging current through the capacitor 44. In this circuit, the rheostat 61 provides a temperature set point control to preset the temperature at which the control turns on. The control gain of the transistor 62 determines the temperature range required to obtain full control; that is, the upper temperature limit with respect to the set point or lower temperature limit.

The circuit of FIG. 7 can provide a somewhat better temperature differential control. However, the high gain of the system has a tendency to cause spurious signal pickup in the lead to the thermistor 41 and for optimum operation requires shielded leads. Silicon transistors should be employed because germanium have a tendency to be temperature dependent and consequently may tend to cause drift of the set point in operation of the circuit and leakage current which may appreciably affect the charging of capacitor 44 and triggering of the trigger diode 45 must be minimized. However, this circuit has been found to provide a highly satisfactory motor control where a much smaller temperature differential is encountered and full range motor control is desired.

The present invention provides a highly improved integrated speed control forming a unitary part of the motor proper. This not only maintains minimum number of leads and connections with a consequent reduced cost but further facilitates installation, maintenance and repairs. The mounting of the components within the air path and particularly the mounting of the solid state switch on the end bell maintains cooling of all the components. This is of substantial significance in connection with conventional solid state switching elements all of which are temperature sensitive. The present invention thus provides for a compact construction while maintaining long life and reliable operation.

Various modes of carrying out the invention are contemplated as being within the scope of the following claims particularly pointing out and distinctly claiming the subject matter which is regarded as the invention.

I claim:
1. In a variable speed alternating current motor,
    a cylindrical housing having apertured end bells secured to the opposite ends to permit fluid flow therethrough,
    an annular stator winding unit including a start winding and a run winding connected with a capacitor to form a permanent split capacitor stator unit, said winding unit being mounted within the housing in spaced relation to one end to define an internal control chamber,
    a rotor concentrically mounted within the winding unit and carried by the shaft,
    a solid state symmetrical switch means connected to one side of the stator windings and including firing means,
    means mounting said switch means on the inner surface of the end bell forming a part of the control chamber, said switch being series connected with the winding unit,
    a firing circuit for said switching means including a voltage dividing network connected in parallel with the switch means and the winding unit and a timing capacitor connected in series with a charging control circuit across a portion of the voltage dividing network, said charging control circuit including a solid state amplifying means having its output connected to charge the capacitor during each half cycle and a control element mounted separately from the other elements and connected to control the bias on the amplifying means and thereby the charging rate of the capacitor, said firing circuit including a trigger diode means connected between the capacitor and the firing means,
    means to mount the switching means and the firing circuit components within the control chamber, and wherein said charging circuit includes a rectifying circuit having input terminals connected between the timing capacitor and the voltage dividing network and having output terminals, said amplifying means being connected across the output terminals in parallel with a control voltage dividing network having the control element therein, said amplifying means having a control terminal means connected to the control voltage dividing network to bias the amplifying means.

2. A motor speed control circuit for a permanent split capacitor motor, comprising:
    a pair of input terminals adapted to be connected to incoming power lines,
    a symmetrical alternating current switch having a single gate means for firing of the switch in both directions, said switch adapted to be series connected with the motor between said input terminals,
    a first firing circuit including a voltage dividing means connected across the input terminals, a thermistor connected in series with a timing capacitor across a portion of the voltage dividing means, and a unidirectional breakdown diode connected between the gate means and the junction of the thermistor and the timing capacitor, and a second firing circuit including a resistor in series with a capacitor connected across the input terminals and a neon lamp connected between the resistor-capacitor junction and the gate means, said second firing circuit being preset to maintain a selected minimum voltage supply to the motor.

3. In a heating source for conditioning of air and employing a motor driven fan for discharging heated air under pressure, a variable speed drive motor for the fan, and a speed control for said drive motor including a temperature responsive means mounted in the path of the air of the fan and responsive to the temperature condition of the heated air to establish a proportionate demand signal over a selected temperature range and proportionately varying the speed of the motor in accordance with the temperature and a second means independent of the heated air to maintain low speed motor operation in the absence of a demand signal to maintain a minimum air movement.

4. An alternating current dynamoelectric machine having a characteristic dependent upon the input voltage impressed on the input means of the dynamoelectric machine and having a control means for varying the input voltage in accordance with a variable condition connected in series with a power line to the motor and comprising:

solid state switching means connected in series with the input means and having an input terminal means for symmetrically switching each half cycle of the input voltage, a terminal board means within the outer housing of the motor, a trigger circuit mounted on the board means and connected to the input terminal means, said trigger circuit includes a voltage dividing means connected across the input terminals and a condition responsive means connected in series with a timing capacitor across a portion of the voltage dividing means and a unidirectional breakdown diode connected between the input means and the junction of the thermistor and the timing capacitor, a second trigger circuit mounted on the board means including a resistor in series with a capacitor connected across the input terminals and a neon lamp connected between the resistor-capacitor junction and the gate means, said second firing circuit being preset to maintain a selected minimum voltage supply to the motor and having its components mounted upon said terminal board means, and condition responsive means having a variable electric condition and being connected in the trigger circuit to adjust the switching time during each half cycle.

References Cited

UNITED STATES PATENTS

| | | | |
|---|---|---|---|
| 2,757,329 | 7/1956 | Lichtenfels | 318—333 |
| 2,991,405 | 7/1961 | Carlson | 318—471 |
| 3,025,443 | 3/1962 | Wilkinson et al. | 318—138 |
| 3,098,958 | 7/1963 | Katz | 318—138 |
| 3,119,055 | 1/1964 | Martin | 318—471 XR |
| 3,198,972 | 8/1965 | Larson | 310—68 |
| 3,225,280 | 12/1965 | Happe et al. | 318—345 XR |
| 3,265,948 | 8/1966 | Sones et al. | 318—227 |

OTHER REFERENCES

AC Motor Speed Control, John E. Mungenast and Neal B. Dowling, Home Appliance Builder, August 1964, pp. 13–15, 38, 318–345.

ORIS L. RADER, *Primary Examiner.*

G. Z. RUBINSON, *Assistant Examiner.*